Figure 1:
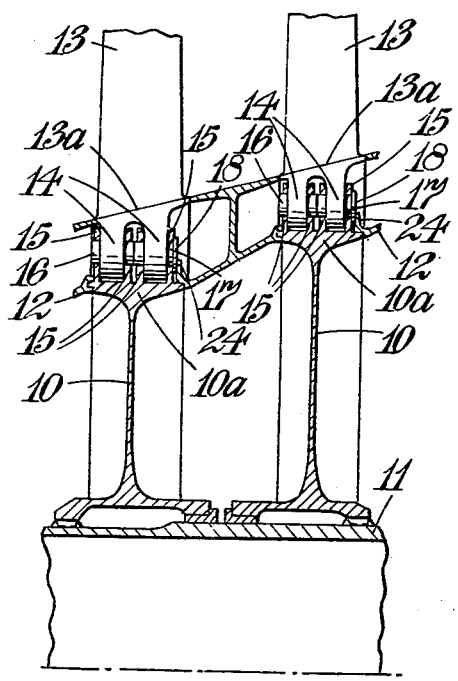

April 18, 1961 A. A. RUBBRA ET AL 2,980,395
ROTOR WITH PIVOTED BLADES FOR COMPRESSORS AND TURBINES
Filed March 29, 1954
2 Sheets-Sheet 1

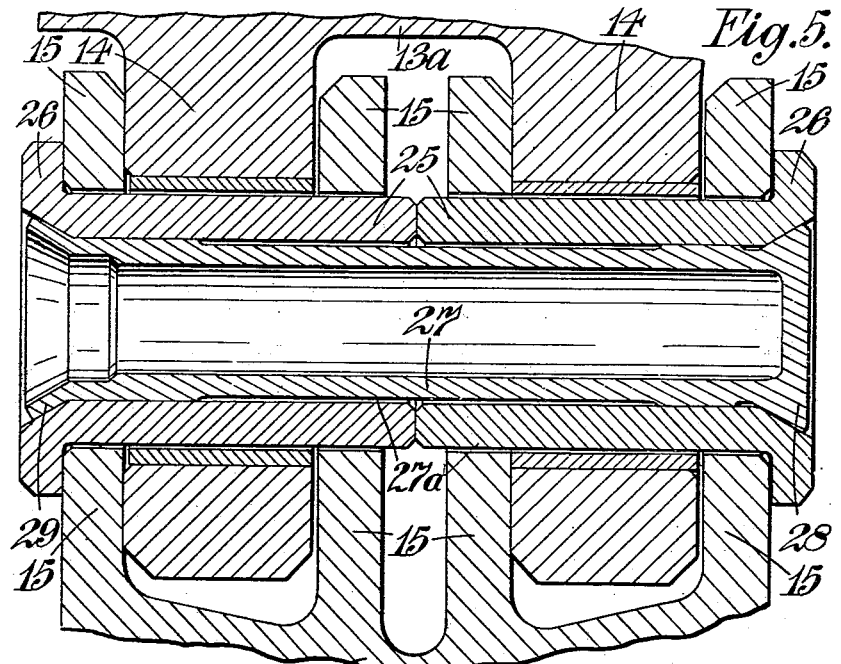
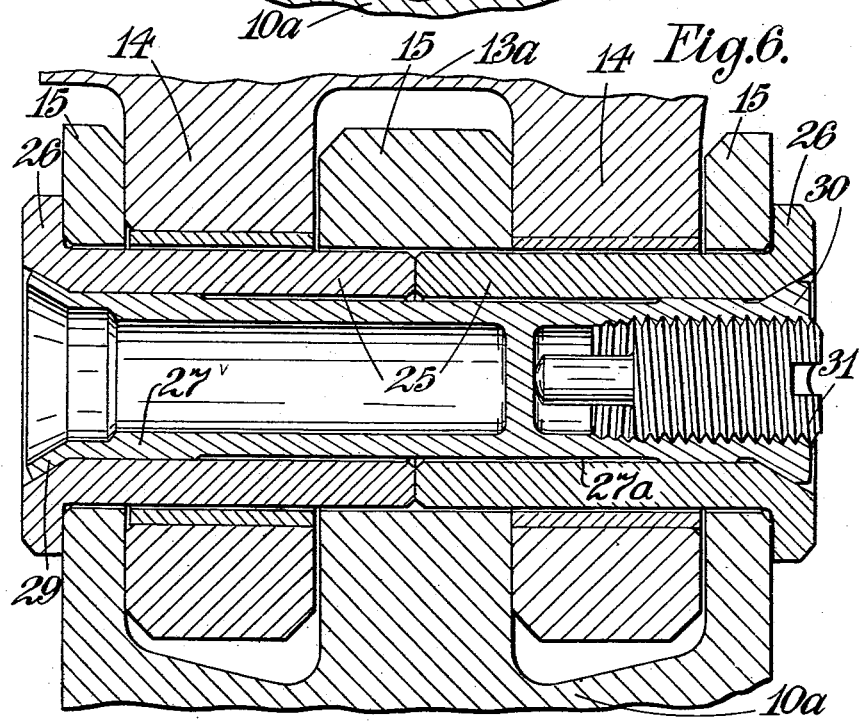

United States Patent Office 2,980,395
Patented Apr. 18, 1961

2,980,395
ROTOR WITH PIVOTED BLADES FOR COMPRESSORS AND TURBINES

Arthur Alexander Rubbra, Littleover, and Ronald Jones, Derby, England, assignors to Rolls-Royce Limited, Derby, England, a British company Filed Mar. 29, 1954, Ser. No. 419,394

Claims priority, application Great Britain Apr. 10, 1953

15 Claims. (Cl. 253—77)

This invention relates to rotors for compressors or turbines, such for instance as form parts of gas-turbine engines and more specifically the invention is concerned with rotors of the kind in which blade elements are pivoted to a rotor disc, drum or like structural part.

Heretofore blade elements have been pivoted to a structural part of a rotor of a compressor or turbine by providing the blade element with one or more lugs at its root end and by forming the structural part with flanges to extend one on each side of each lug, and by providing a pivot pin for each blade element which pin extends through aligned bores in the lugs of a blade element and in the flanges which extend on each side of the lugs.

This invention has for an object to provide an improved pivot arrangement whereby wear of the pivot pin may be reduced.

According to the present invention in one aspect, in a rotor for a compressor or turbine, there is provided a blade part pivoted to a rotor structural part, one of said parts having at least two lugs each extending between a pair of flanges on the second part, and a plurality of axially aligned pivot pin elements whereof each pin element engages bores in a lug and the flanges on each side of the lug.

According to the present invention in another aspect, in a rotor for a compressor or turbine, there are provided a plurality of blade elements pivoted to a structural part of the rotor, whereof each blade element has at its root end at least two lugs each extending between a pair of flanges on the structural part, and each blade element is pivotally connected to the flange by a plurality of axially aligned pivot pin elements whereof each pin element engages bores in a lug and the flanges on each side of the lug.

Preferably each lug of a blade element extends between a pair of flanges which are separate from the pair or pairs of flanges between which the other lug or lugs of the blade element extend. If desired, however, a flange which lies between a pair of lugs may be engaged by the pivot pin elements associated with both of said lugs.

According to a feature of this invention, adjacent axially aligned pivot pin elements may be interconnected in a manner facilitating their engagement with the bores in the lugs of the associated blade element and in the corresponding flanges, whilst leaving the pin elements free for relative rotational movement when engaged in their respective bores. Additionally the pivot pin elements may be free for limited relative axial movement.

According to this invention in yet another aspect, there is provided a pivot pin assembly for use in connecting a blade element having a plurality of lugs at its root end pivotally to a structural part of a compressor or turbine rotor, which pivot pin assembly comprises a pair of pivot pin elements, whereof one element has formed thereon an axially-projecting stem with an enlarged head, and whereof the other pivot pin element has a radially-inwardly projecting flange with an aperture therein which aperture has two portions, one of which portions is offset radially of the pivot pin axis and permits the passage through it of the head of said axial projection and the other of which portions receives the stem of the axial projection when the two pin elements are axially aligned but is smaller in axial section than the head thereby to prevent passage of the head when the pin elements are axially aligned. With this arrangement, when the pivot pin assembly is engaged with the lugs on the blade element and the flanges on the structural part, the enlarged head prevents axial separation of the pivot pin elements and since the elements are restrained against relative movement radially of their axes, the head cannot come into alignment with the portion of the aperture which permits axial separation of the pivot pin elements. The arrangement permits relative rotational movement of the pivot pin elements.

According to the invention in a further aspect, there is provided a pivot pin assembly for use in connecting a blade element having a plurality of lugs at its root end pivotally to a structural part of a compressor or turbine rotor, which pivot pin assembly comprises a pair of hollow pivot pin elements and a member extending through the pin elements and adapted to hold them in axial alignment and against axial separation and to leave them free for relative rotation.

Figure 2:
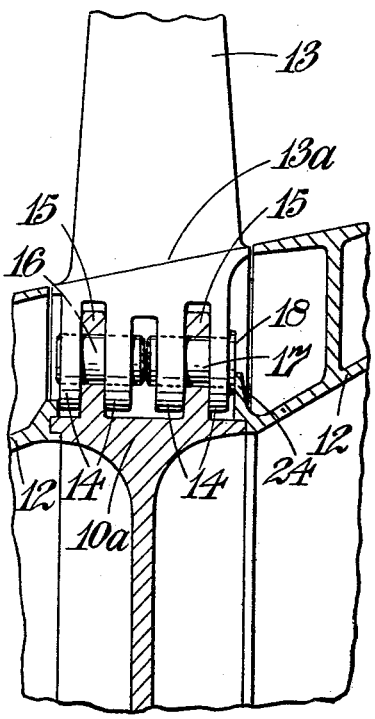
Figure 3:
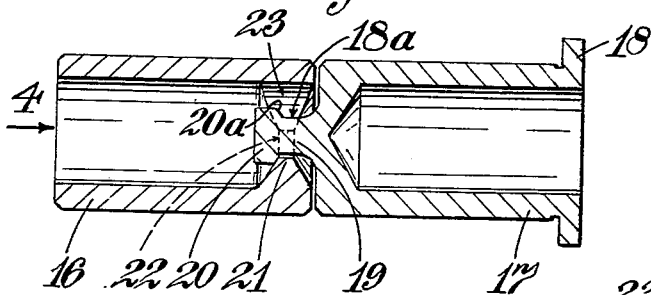
Figure 4:
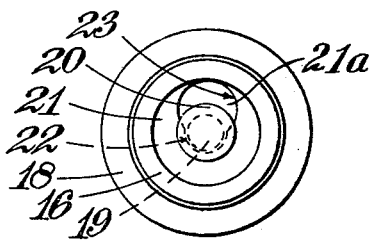

Some constructions according to this invention, as can be employed in the rotor of an axial-flow compressor of a gas-turbine engine, will now be described with reference to the accompanying drawings in which:

Figure 1 illustrates in axial section part of a multi-stage, axial-flow compressor, Fig. 2 illustrates a modification to the arrangement of Figure 1, Figure 3 illustrates in axial section a first form of pivot pin of this invention as applied to the structure of Figure 2, Figure 4 is a view in the direction of the arrow 4 on Figure 3, Figure 5 illustrates a second form of pivot of this invention, and Figure 6 illustrates a third form of pivot.

Referring to Figure 1, the rotor of the axial-flow compressor is illustrated as comprising a number of axially thin discs 10 which are carried on a central shaft 11 and held in spaced relation at their peripheries by spacer rings 12. The whole assembly is secured together in a manner not shown but which comprises an abutment on the shaft 11 and nut means engaged with the shaft 11 and bearing on one end of the discs 10 of the assembly.

The number of discs 10 corresponds to the number of stages of rotor blading 13 and the blades forming some at least of the stages of rotor blading 13 are pivoted to the peripheries 10a of their respective discs 10.

The following arrangement is employed to mount the blade elements 13 of such a stage of rotor blading pivotally on the periphery 10a of its associated disc 10.

Each blade element 13 of the stage of rotor blading is formed at its inner end with a blade platform 13a from which the operative portion of the blade extends and from the underside of which extend a pair of axially-spaced radially-extending lugs or flanges 14 having aligned bores therein.

The periphery 10a of the associated disc 10 is axially thickened and is provided with four axially-spaced, radially-extending peripheral flanges 15, the spacing of the upstream pair of flanges 15 being equal to the axial thickness of the upstream lug or flange 14 of a blade element 13 and the axial spacing of the downstream pair of flanges 15 being equal to the axial thickness of the downstream lug or flange 14 of the blade element 13. The two pairs of flanges 15 have such an axial spacing that each blade element can be presented to the periphery 10a of the disc 10 with the upstream lug or flange 14 between the upstream pair of flanges 15 and the downstream lug or flange 14 between the downstream pair of flanges 15. The flanges 15 are formed with axially aligned bores of a diameter slightly less than the diameter of the bores in the lugs or flanges 14 and there is provided one set of aligned bores for each blade element 13.

Each blade element 13 is held in position on the disc periphery 10a with the bores in its lugs or flanges 14 aligned with the corresponding set of bores in the flanges 15 by a pivot pin assembly which in effect comprises an individual pivot pin element for each lug or flange 14. Each pivot pin element is thus engaged with a pair of flanges 15 and one lug or flange 14. The pivot pin elements 16, 17 are arranged so that they can move rotationally relative to one another and this arrangement reduces wear on the pivot pin elements.

Referring now to Figure 2 which illustrates a modification to Figure 1 and in which the same references are used to indicate the same parts as in Figure 1, the blade platform 13a has extending from its underside two pairs of lugs or flanges 14, and the periphery 10a of the disc 10 is provided with two flanges 15, the axial spacing of the upstream pair of lugs or flanges 14 being equal to the axial thickness of the upstream flange 15 and the axial spacing of the downstream pair of lugs being equal to the axial thickness of the downstream flange 15, the two flanges being spaced axially so that the blade element can be presented to the periphery 10a of the disc with the upstream flange 15 between the upstream pair of lugs or flanges 14 and the downstream flange 15 between the downstream pair of lugs or flanges 14. The flanges 15 and lugs 14 are again provided with a set of axially-aligned bores and the blade element is held in position on the disc periphery 10a by means of a pivot pin assembly 16, 17 as in Figure 1.

To prevent axial separation of the pivot pin elements 16, 17 and to facilitate assembly, the pivot pin element 17 (Figure 3) is formed at one end with a radially outwardly-extending abutment flange 18 and at its opposite end with a central axial projection generally indicated at 18a. This projection has a stem portion 19 and at the free end of the stem portion an enlarged head 20 in the form of a radial flange. The outwardly-extending surface 20a of the head 20 which is nearer the stem 19 is of frusto-conical form.

The pivot pin element 16 is hollow having a central bore and has adjacent one end an inwardly-directed flange 21 of such form as to provide an aperture 21a (Figure 4) with a contour formed by arcs of two intersecting circles of different diameters whose centres are radially offset from one another. One portion 22 of the aperture 21a has its centre on the axis of the pivot pin element 16 and has a diameter just sufficient to accommodate the stem 19 of the axial projection on the first pivot pin element, and the second portion 23 of the aperture has a diameter to permit the passage through it of the flanged head 20. The flange 21 affording this aperture 22, 23 has its axially-facing surfaces of frusto-conical form so that the flange decreases in axial thickness towards the centre of the pivot pin element 16.

To secure a blade element 13 to the disc 10 the bores in the lugs or flanges 14 on the blade element 13 are brought into line with the corresponding set of bores in the flanges 15 on the disc periphery 10a, the pivot pin elements 16, 17 are joined together by passing the head 20 on the axial projection of the pivot pin element 17 through the larger diameter portion 23 of the aperture in the pivot pin element 16 and then bringing the pivot pin elements 16, 17 into axial alignment so locking them against axial separation, and then inserting the pivot pin elements 16, 17 together as one pin into the aligned bores in the lugs or flanges 14 and flanges 15 until the abutment flange 18 on the pin element 17 abuts against one of the outermost flanges 15 on the disc periphery in the arrangement of Figure 1 or against one of the outermost lugs or flanges 14 on the underside of each of the blade elements 13 in Figure 2.

The axial length of the stem 19 of the axial projection 18a on the pivot pin element 17 is such that the pivot pin elements 16, 17 are free for axial movement with respect to one another to a limited extent, the axial movement in one direction being limited by abutment of the adjacent ends of the pivot pin elements and the axial movement in the opposite direction being limited by abutment of the enlarged head 20 with the internal flange 21 of the pivot pin element 16.

The pivot pin assemblies 16, 17 may be restrained against disengagement from the disc periphery 10a in any convenient manner, for example, the spacer ring 12 which separates one disc 10 from an adjacent disc 10 may be provided with a radial flange 24 to overlap the abutment flanges 18 of the pivot pin elements 17.

Referring now to Figures 5 and 6, in which those parts which are the same as in Figures 1 to 4 are indicated by the same references, the pivot pin assembly comprises a pair of hollow pivot pins 25 each with an abutment flange 26 to bear against an outer flange 15 and a hollow rivet 27 which holds the pins 25 against axial separation but leaves them free for relative rotation.

In each case the rivet has a reduced diameter external surface 27a over the greater part of its length so that it contacts the pivot pin elements 25 only adjacent its outer ends.

Referring now to Figure 5, the rivet 27 has at one end a solid head 28 of external frusto-conical form which engages a frusto-conical recess in the outer end of the adjacent pivot pin element 25 and has at its opposite end a thinner and deformable end portion 29 which, on assembly, is expanded outwards to form a flange as shown to lie against a frusto-conical recess in the outer end of the other pivot pin element 25.

Referring now to Figure 6, in which a single central flange 15 is engaged by both of the pivot pin elements 25, the rivet 27 in this case also has a flange 29 to engage in a frusto-conical recess in one pivot pin element 25 and has at its opposite end a hollow head having an external frusto-conical form to engage in a frusto-conical recess in the outer end of the other pivot pin element. The bore of the rivet 27 adjacent the head 30 is threaded to receive a screw-threaded plug 31 which may be employed for balancing purposes.

It will be seen that in both the construction of Figure 5 and the construction of Figure 6 there is a substantial clearance between the shanks of the pivot pin elements 25 and the bores in the flanges 15 and lugs or flanges 14. Also the sum of the lengths of the shanks of the pivot pin elements 25 are such that the spacing of the flanges 26 is slightly greater than the spacing of the outer flanges 15.

We claim:

1. A rotor for a compressor or turbine comprising a rotor structural part, and a blade element, and means pivotally connecting the blade element to the rotor structural part comprising two lugs at one end of the blade element, the lugs being spaced apart along the pivotal axis of the blade element, at least three radial flanges on said structural part at its periphery, said flanges being spaced apart along said pivotal axis, each of the lugs extending between a corresponding pair of said flanges, axially aligned bores in all said lugs and flanges and a plurality of pivot pin elements, each pivot pin element solely engaging the bore in one lug and the corresponding pair of flanges between which it extends and said pivot pin elements being axially aligned whereby the blade element is pivotally connected to the rotor structural part and relative rotation of the lugs on the blade owing to twisting of the blade is accommodated by relative rotation of the aligned pivot pin elements and frettage of the pivot pin elements is reduced, adjacent axially aligned pivot pin elements having an inter-connection facilitating their engagement with the bores in the lugs and the flanges and permitting relative rotational movement of the pivot pin elements when engaged in their respective bores.

2. A rotor as claimed in claim 1, wherein said interconnection also permits limited relative axial movement of the aligned pivot pin elements.

3. A rotor for a compressor or turbine comprising a blade element and a rotor structural part, the rotor structural part having at its periphery a plurality of radial flanges, the blade element having at least two lugs each of which extends between a corresponding pair of the radial flanges, axially-aligned bores in all said lugs and flanges, and a plurality of pivot pin elements, each pivot pin element solely engaging the bore in one lug and the corresponding pair of flanges between which it extends and said pivot pin elements being axially aligned whereby the blade element is pivotally connected to the rotor structural part and relative rotation of the lugs on the blade owing to twisting of the blade is accommodated by relative rotation of the aligned pivot pin elements and frettage of the pivot pin elements is reduced, one of a pair of said axially aligned pivot pin elements comprising an axially-projecting stem, an enlarged head on said stem, and the other pivot pin element having a radially-inwardly projecting flange with an aperture therein which aperture has two portions, one of which portions is offset radially of the pivot pin axis and has a size permitting the passage through it of the head of said axial projecting stem and the other of which portions is adapted to receive the stem when the two pin elements are axially aligned but is smaller in cross-section than the head thereby to prevent passage of the head when the pin elements are axially aligned, the pin elements being interengaged with freedom for relative rotation by the head being passed through said one portion of the aperture and the pin elements then being brought into axial alignment with the stem in the other portion of the aperture and the head out of line with the one portion of the aperture and behind the flange.

4. A rotor as claimed in claim 3, wherein said axially-projecting stem has an axial dimension greater than the axial thickness of said radially-inwardly projecting flange, whereby the pivot pin elements are free for limited relative axial displacement.

5. A rotor for a compressor or turbine comprising a blade element and a rotor structural part, the rotor structural part having at its periphery a plurality of radial flanges, the blade element having at least two lugs each of which extends between a corresponding pair of the radial flanges, axially-aligned bores in all said lugs and flanges, and a plurality of pivot pin elements, each pivot pin element solely engaging the bore in one lug and the corresponding pair of flanges between which it extends and said pivot pin elements being axially aligned whereby the blade element is pivotally connected to the rotor structural part and relative rotation of the lugs on the blade owing to twisting of the blade is accommodated by relative rotation of the aligned pivot pin elements and frettage of the pivot pin elements is reduced, said pivot pin elements being hollow, and a member extending through the hollow pivot pin elements, holding them in axial alignment and against axial separation and leaving them free for relative rotation.

6. A rotor as claimed in claim 5, wherein said member is in the form of a rivet extending through the pivot pin elements and having a frusto-conical surface at each end to engage corresponding recesses in the outer ends of the pivot pin elements.

7. A rotor for a compressor or turbine comprising a blade element, a rotor structural part, a plurality of lugs on the blade element, a plurality of flanges on the periphery of the rotor structural part, each of said flanges extending between a pair of said lugs, axially aligned bores in said lugs and flanges, and a pair of pivot pin elements, each of which engages the bores in a corresponding one of said flanges and the pair of lugs between which it extends, said pivot pin elements being axially aligned whereby the blade element is pivotally connected to the rotor structural part, adjacent axially aligned pivot pin elements having an interconnection facilitating their engagement with the bores in the lugs and the flanges and permitting relative rotational movement of the pivot pin elements when engaged in their respective bores.

8. A rotor as claimed in claim 7, wherein said interconnection also permits limited relative axial movement of the aligned pivot pin elements.

9. A rotor for a compressor or turbine comprising a blade element, a rotor structural part, a plurality of lugs on the blade element, a plurality of flanges on the periphery of the rotor structural part, each of said flanges extending between a pair of said lugs, axially aligned bores in said lugs and flanges, and a pair of pivot pin elements, each of which engages the bores in a corresponding one of said flanges and the pair of lugs between which it extends, said pivot pin elements being axially aligned whereby the blade element is pivotally connected to the rotor structural part, one of said pair of axially aligned pivot pin elements comprising an axially-projecting stem, an enlarged head on the stem, and the other pivot pin element having a central bore at one end of the bore having a radially-inwardly projecting flange with an aperture therein which aperture has two portions, one of which portions is offset radially of the pivot pin axis and has a size permitting the passage through it of the head and the other of which portions is adapted to receive the stem when the two pin elements are axially aligned but is smaller in cross-section than the head thereby to prevent passage of the head when the pin elements are axially aligned, said pin elements being interengaged with freedom for relative rotation by the head being passed through the one portion of the aperture into the bore and the pin elements then being brought into alignment with the stem in the other porion of the aperture and with the head out of line with the one portion of the aperture and behind the flange.

10. A rotor as claimed in claim 9, wherein said axially-projecting stem has an axial dimension greater than the axial thickness of said radially-inwardly projecting flange, whereby the pivot pin elements are free for limited relative axial displacement.

11. A rotor for a compressor or tubine comprising a blade element, a rotor structural part, a plurality of lugs on the blade element, a plurality of flanges on the periphery of the rotor structural part, each of said flanges extending between a pair of said lugs, axially aligned bores in said lugs and flanges, and a pair of pivot pin elements, each of which engages the bores in a corresponding one of said flanges and the pair of lugs between which it extends, said pivot pin elements being axially aligned whereby the blade element is pivotally connected to the rotor structural part, said pivot pin elements being hollow, and comprising a member extending through the pin elements, holding them in axial alignment and against axial separation and leaving them free for relative rotation.

12. A rotor as claimed in claim 11, wherein said member is in the form of a rivet extending through the pivot pin elements and having a frusto-conical surface at each end to engage corresponding recesses in the outer ends of the pivot pin elements.

13. A rotor for a compressor or turbine comprising a blade part and a rotor structural part, each having a leading edge portion and a trailing edge portion, said blade during operation partaking of torsional vibrations about its longitudinal axis so that the leading edge portion of the blade part moves angularly with respect to the trailing edge portion of the blade part, flanges on one of said parts at the leading edge and trailing edge portions thereof, cooperating flanges on the other of said parts at the leading and trailing edge portions thereof, the flanges on said other of said parts being arranged in pair each of which pairs corresponds and cooperates with one of the flanges on said one of said parts, each flange on said one part extending between a corresponding pair of the flanges on the other of said parts, co-axial bores in the flanges on said parts, a pivot pin element engaging in the bores in the flanges at the leading edge portions only of said parts, a separate and co-axial pivot pin element engaging in the bores in the flanges at the trailing edge portions only of said parts, and means holding said pins in axial alignment while permitting relative rotation of the pin elements.

14. A rotor as claimed in claim 13, wherein said holding means also permits limited relative axial movement of the pin elements and comprises cooperating parts on said pin elements.

15. A rotor for a compressor or turbine comprising a rotor structural part, and a blade element, and means pivotally connecting the blade element to the rotor structural part comprising two lugs at one end of the blade element, the lugs being spaced apart along the pivotal axis of the blade element, two axially-spaced pairs of axially-spaced radial flanges on said structural part at its periphery, said flanges being spaced apart along said pivotal axis, one of said two lugs extending between one of said pairs of said radial flanges and the other of said two lugs extending between the other pair of said radial flanges, axially aligned bores in all said lugs and flanges and a plurality of pivot pin elements, each pivot pin element solely engaging the bore in one lug and the corresponding pair of flanges between which it extends and said pivot pin elements being axially aligned whereby the blade element is pivotally connected to the rotor structural part and relative rotation of the lugs on the blade owing to twisting of the blade is accommodated by relative rotation of the aligned pivot pin elements and frettage of the pivot pin elements is reduced, adjacent axially aligned pivot pin elements having an interconnection facilitating their engagement with the bores in the lugs and the flanges and permitting relative rotational movement of the pivot pin elements when engaged in their respective bores.

References Cited in the file of this patent

UNITED STATES PATENTS

| | | |
|---|---|---|
| 612,815 | Bright | Oct. 25, 1898 |
| 2,326,145 | Kroon | Aug. 10, 1943 |
| 2,404,076 | Leighton | July 16, 1946 |
| 2,406,940 | Brill | Sept. 3, 1946 |
| 2,435,427 | Eastman | Feb. 3, 1948 |
| 2,625,366 | Williams | Jan. 13, 1953 |
| 2,635,848 | McDowell | Apr. 21, 1953 |
| 2,711,631 | Willgoos | June 28, 1955 |
| 2,819,869 | Meyer | Jan. 14, 1958 |

FOREIGN PATENTS

| | | |
|---|---|---|
| 302,953 | Great Britain | Dec. 21, 1928 |
| 621,315 | Great Britain | Apr. 7, 1949 |
| 679,714 | Great Britain | Sept. 24, 1952 |
| 989,556 | France | May 23, 1951 |